(12) United States Patent
Heo et al.

(10) Patent No.: US 8,550,533 B2
(45) Date of Patent: Oct. 8, 2013

(54) HORIZONTAL FOLDING TYPE SUNROOF APPARATUS

(75) Inventors: Seung-Jin Heo, Seoul (KR); Jay-Il Jeong, Seoul (KR); Il-Hwan Kim, Seoul (KR); In-Sik Hwang, Seoul (KR)

(73) Assignee: Kookmin University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 13/329,509

(22) Filed: Dec. 19, 2011

(65) Prior Publication Data

US 2012/0153686 A1 Jun. 21, 2012

(30) Foreign Application Priority Data

Dec. 20, 2010 (KR) .......................... 10-2010-0130983

(51) Int. Cl.
*B60J 7/14* (2006.01)
(52) U.S. Cl.
USPC ....................................................... 296/108
(58) Field of Classification Search
USPC ........... 296/219, 220.01, 107.16, 107.17, 108
See application file for complete search history.

(56) References Cited

U.S. PATENT DOCUMENTS

| 2,704,225 | A * | 3/1955 | Anschuetz et al. ........... 296/108 |
| 3,357,738 | A * | 12/1967 | Bourlier ........................ 296/108 |
| 6,425,622 | B2 * | 7/2002 | Eberle ........................... 296/108 |
| 6,786,528 | B2 * | 9/2004 | Guillez et al. ................ 296/108 |
| 6,830,282 | B2 * | 12/2004 | Guillez et al. ........... 296/107.08 |
| 6,921,124 | B2 * | 7/2005 | Guillez et al. ................ 296/108 |
| 6,957,843 | B2 * | 10/2005 | Guillez ..................... 296/107.2 |
| 7,000,973 | B2 * | 2/2006 | Guillez et al. ........... 296/107.08 |
| 7,290,825 | B2 * | 11/2007 | Guillez et al. ................ 296/108 |
| 7,309,099 | B2 * | 12/2007 | Netzel et al. .................. 296/108 |
| 7,559,597 | B2 * | 7/2009 | Mori ............................ 296/108 |

* cited by examiner

*Primary Examiner* — Dennis Pedder
(74) *Attorney, Agent, or Firm* — LRK Patent Law Firm

(57) ABSTRACT

Provided is a sunroof apparatus of the present invention including a sunroof panel that divides a roof panel, except for left and right side fillers of the roof of a vehicle, into a front panel, a middle panel, and a rear panel, and link units composed of an interlink that moves middle panel by the operation of a driving link moving rear panel and a driven link that moves front panel by the operation of interlink, such that all of the portions, except for left and right side fillers of the roof of the vehicle are completely opened while rear panel, middle panel, and front panel are folded in several steps and horizontally stacked when the sunroof is opened, such that open feel, which is maximized like a convertible vehicle.

7 Claims, 14 Drawing Sheets

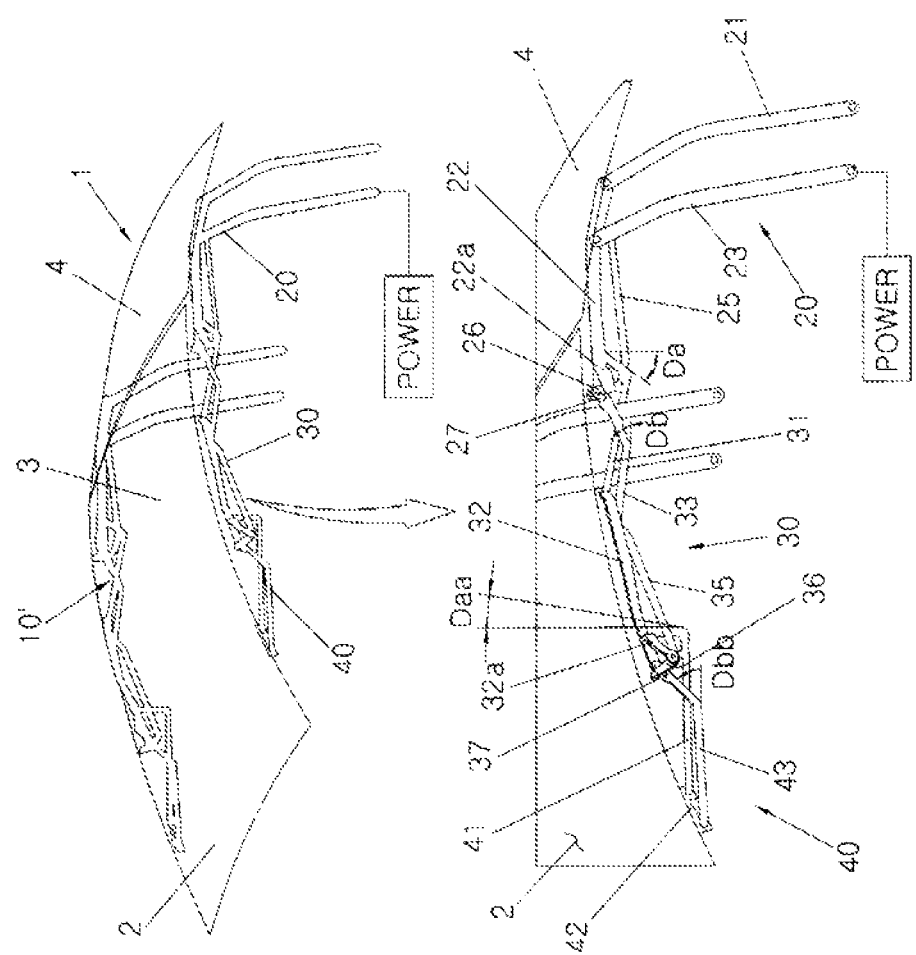

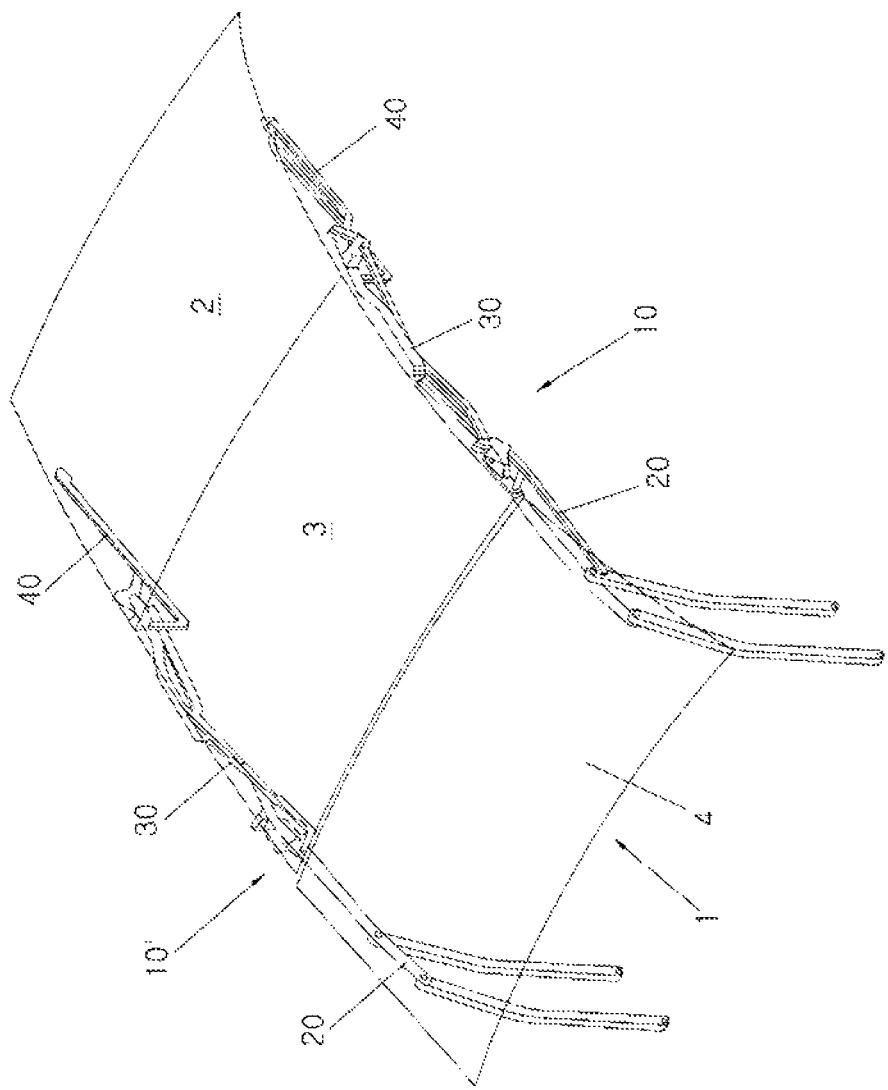

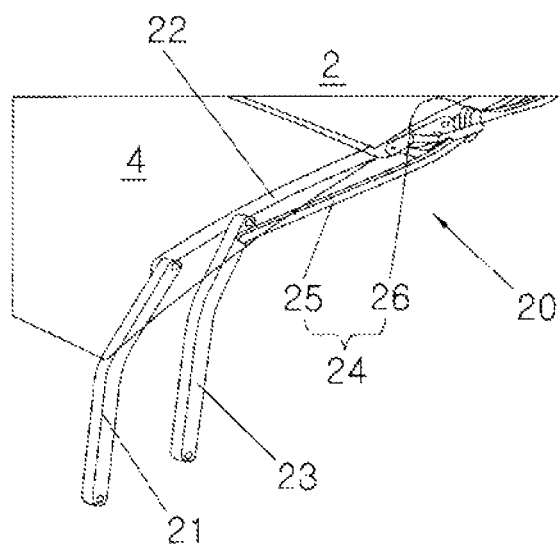

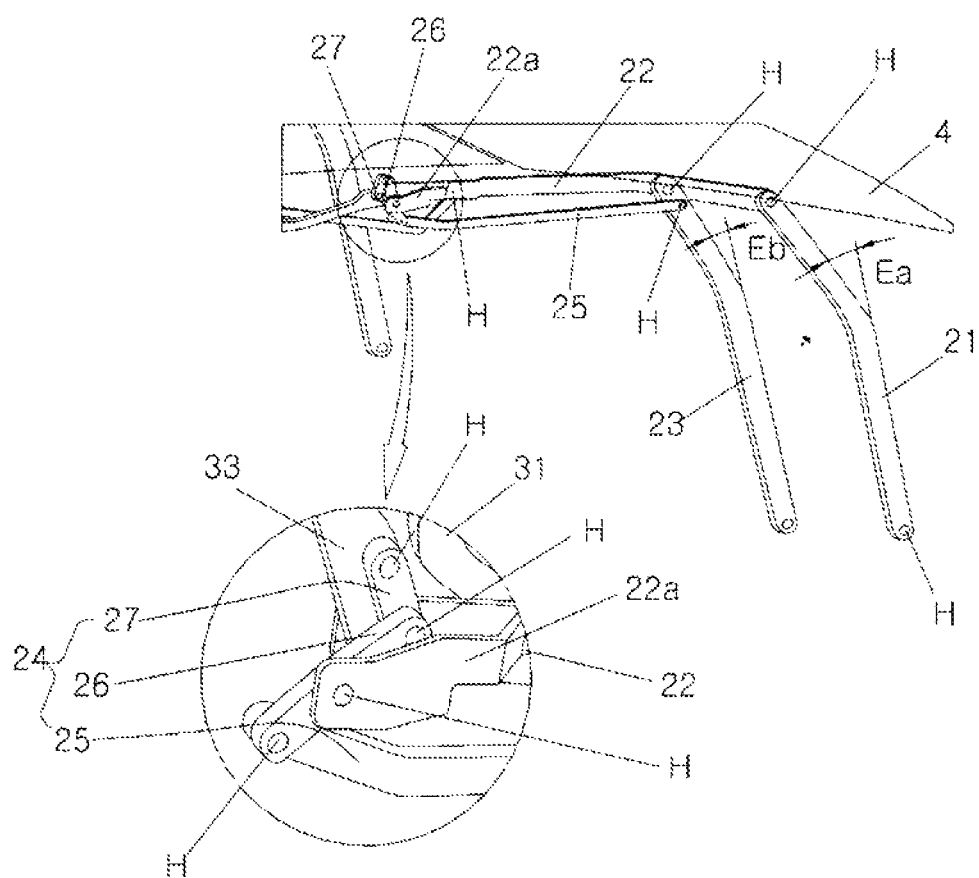

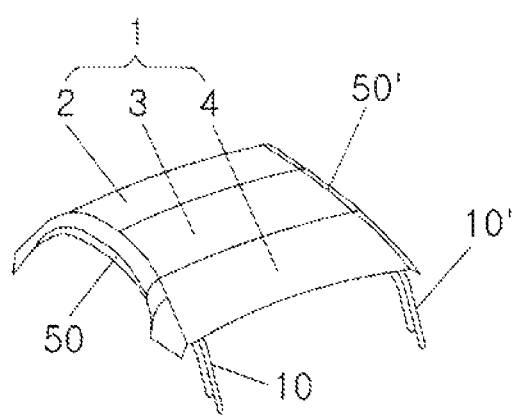

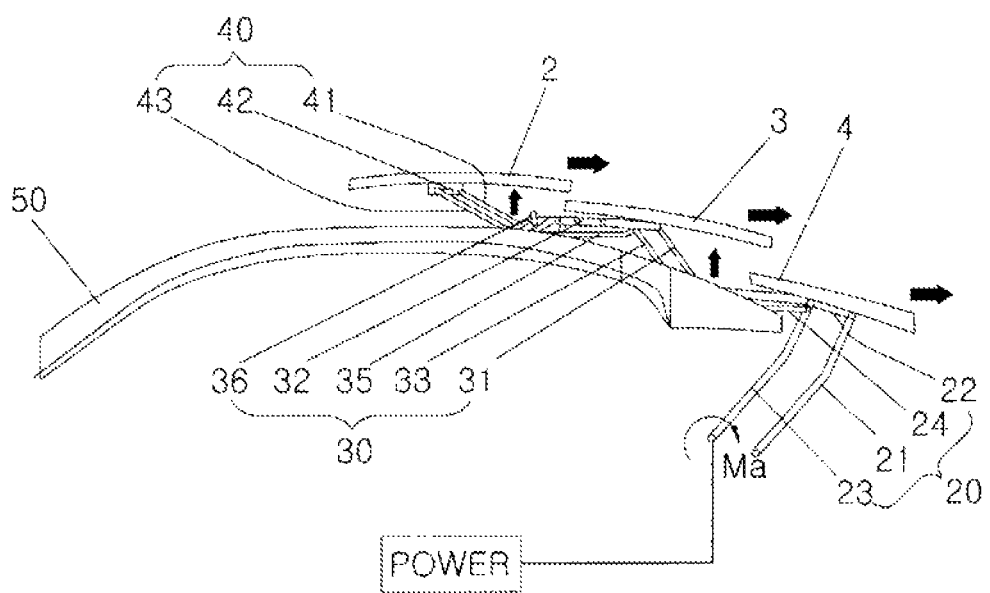

HORIZONTAL FOLDING TYPE SUNROOF APPARATUS

CROSS-REFERENCE TO RELATED APPLICATIONS

The present application claims priority to Korean Patent Application Number 10-2010-0130983 filed Dec. 20, 2010, the entire contents of which application is incorporated herein for all purposes by this reference.

BACKGROUND OF THE INVENTION

1. Field of the Invention

The present invention relates to a sunroof for a vehicle, and particularly, to a horizontal folding type sunroof apparatus that can open all of the spaces, except for the side fillers at the left and right sides of the roof of a vehicle.

2. Description of Related Art

In general, a sunroof ventilates the indoor of a vehicle or partially provides open feel which can be provided by a convertible vehicle, by opening a predetermined section of the roof of a vehicle.

The sunroof is implemented in an opening/shutting type that moves up/down the front or rear portion of the sunroof at a predetermined height and a sliding type that is pulled forward or slides backward in a vehicle, in accordance with the operation type for opening/closing.

FIG. 10 shows when a sliding type sunroof for opening a predetermined section of the roof of a vehicle is mounted.

As shown in the figure, a sunroof space 100a formed by opening a predetermined section is formed through a roof panel 100 in the roof of a vehicle and a sunroof 200 mounted in sunroof space 100a and opens a portion of sunroof space 100a while sliding.

Sliding type sunroof 200 described above includes a guide rail 201 disposed along sunroof space 100a of roof panel 100, a frame 202 combined with a glass 203 and sliding along guide rail 201, and a moving unit implementing a sliding movement with a motor, which is a power source.

Recently, sunroofs are required to be modified in various ways in consideration of providing open feel, like a convertible car, with an increase in quality of vehicles.

In general, although it is possible to provide satisfactory open feel by increasing the open area of the roof panel by using a sunroof, when the open area of a sunroof is increased only in consideration of the open feel, drone noise is generated by resonance of the air flow with a low frequency passing the sunroof and the air in a vehicle and vortex noise is generated by wind noise, which necessarily decreases the commercial quality.

However, it is difficult to satisfy the user's high requests for the open feel in the structure having sunroof space 100 formed through roof panel 100 in a predetermined size, even though sunroof 200 is opened, as described above.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a horizontal folding type sunroof apparatus that can provide maximized open feel, like a convertible car, by opening all of section of a roof panel, except for only both side fillers of the roof of a vehicle, and prevent deterioration in the esthetic appearance of the vehicle due to opening of the sunroof by horizontally stacking the open roof panel in several layers and accommodating the roof panel in a trunk room.

An exemplary embodiment of the present invention provides a horizontal folding type sunroof apparatus, including a sunroof panel that divides a roof panel, except for left and right side fillers of the roof of a vehicle, into a base panel and at least one or more panels, and is fully opened such that the divided panels are stacked horizontally with the base panel and received in a trunk room; and a link unit that moves the base panel by using power input with the base panel connected with the divided panels, allows the divided panels to be folded and horizontally stacked in several steps with gaps with respect to the base panel, and generates movement for sequentially unfolding the divided panels from the base panel.

The sunroof panel divides the roof panel into a middle panel and a front panel extending to the front portion of the vehicle with a rear panel position at the trunk room as the base panel, and the rear panel, the middle panel and the front panel are connected by the link unit.

The link unit includes a driving link that is hinged to the roof of the vehicle and receives power to move the rear panel; an interlink that is pulled from the driving link to move up/down the middle panel and move the middle panel to the rear panel or unfolds the middle panel from the rear panel; and a driven link that is pulled from the interlink to move up/down the front panel and moves the front panel to the middle panel or unfolds the front panel from the middle panel.

The driving link includes a first panel support rod that is hinged to the roof of the vehicle; an input rod that makes movement by using the input power; a first panel support bracket that generates movement of the rear panel about the panel support rod by moving via the input rod; and a first coupling rod that moves up/down by generating rotation at the opposite side from the movement due to the operation of the input rod.

The first panel support rod and the input rod are bent to form the horizontal height of the rear panel when being horizontally folded, and the first panel support bracket is bent to be inclined with respect to the rear panel.

The interlink includes a second panel support rod that is fixed to the first panel support bracket of the driving link to follow the movement of the first panel support bracket; a second panel support bracket that is moved through the second panel support rod and generates the movement of the middle panel; a first transmission rod that is fixed to the second panel support bracket to move up/down the middle panel by using the movement from the first coupling rod of the driving link; and a second coupling rod that moves up/down by generating rotation at the opposite side by using the movement of the transmission rod.

The second panel support rod and the transmission rod are bent to reduce the gap between the rear panel and the middle panel when being horizontally folded, and the second panel support bracket is bent to be inclined with respect to the middle panel.

The rotating portion of the second coupling rod is hinged to the second panel support bracket and forms a rotational center.

The second coupling rod includes a transporting rod that is fixed to the transmission rod and follows the movement the transmission rod; a first converting rod that is fixed to the bent end of the transporting rod and hinged to the second panel support bracket; and a second converting rod that is hinged to the first converting rod and folded or unfolded by rotation of the first converting rod.

The first converting rod and the second converting rod are unfolded straight from the folded state at 90 degrees when the sunroof is opened, and are folded at 90 degrees from the straight unfolded state when the sunroof is closed.

The driven link includes a third panel support rod that is fixed to the second panel support bracket of the inter link and follows the movement of the second panel support bracket; a third panel support bracket that generates movement of the front panel by moving through the third panel support rod; and a second transmission rod that is fixed to the third panel support bracket to move up/down the front panel by using the movement of the second coupling rod of the interlink.

The third panel support rod and the second transmission rod are bent to reduce the gap between the middle panel and the front panel when being horizontally folded.

According to the exemplary embodiment of the present invention, it is possible to greatly increase the user's satisfactory and the commercial quality with maximized open feel like a convertible vehicle, by opening all of sections of a roof panel, except for only left and right side fillers of the roof of a vehicle, and it is also possible to prevent deterioration in the esthetic appearance of the vehicle due to opening of the sunroof by receiving the sunroof panels in a trunk room in a horizontally stacked state, with the sunroof fully open.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 1 is a view showing the configuration of a horizontal folding type sunroof apparatus according to the present invention.

FIG. 2 is a perspective view of FIG. 1 seen from above.

FIGS. 3 to 5 are views showing the configuration of a link unit that folds and horizontally stacks a sunroof panel in several layers in accordance with the present invention.

Figure 4:
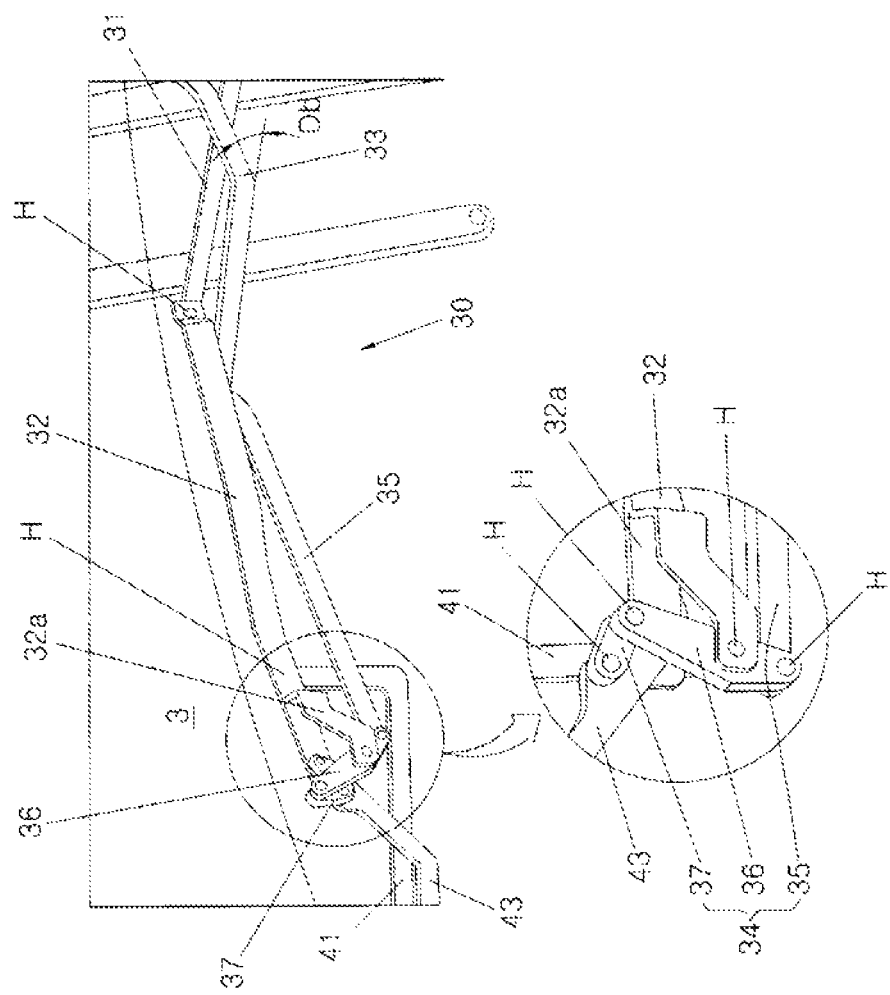

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 and 2, a sunroof apparatus includes a sunroof panel 10 divided into at least one or more panels, except for left and right side fillers 50 and 50' of the roof of a vehicle, and link units 10 and 10' formed by hinging a plurality of rods to support the left and right sides of sunroof panel 10 and allows the divided panels of sunroof panel 1 are horizontally stacked and received in a trunk room 60 by an input from a power source.

In the exemplary embodiment, the power source is implemented by an electric motor that generates a rotational force by being driven by a button disposed at an appropriate position, such as a the driver's seat and opens sunroof panel 10 by rotating and pushing link unit 10 and 10' in the rotation direction of the electric motor or closes sunroof panel 1 by pulling link units 10 and 10'.

A saw teeth structure or a gear structure that functions as a decelerator for increasing output torque and applies rotation to link units 10 and 10' may be disposed between the electric motor and link units 10 and 10'.

A nut-and-screw structure that converts rotation of the electric motor into straight motion may be disposed, in which sunroof panel 1 is opened by pushing link units 10 and 10' or sunroof panel 1 is closed by pulling link units 10 and 10' by axial straight movement of the screw.

The power source is disposed at an appropriate position, but preferably disposed around left and right side fillers 50 and 50' of the roof of the vehicle.

Sunroof panel 1 is the entire roof panel, except for side fillers 50 and 50' at the left and right sides, and in the exemplary embodiment, is divided into a front panel 2 disposed at the front portion of the vehicle, a rear panel 4 disposed at trunk room 60, and a middle panel 3 disposed in a space extending from front panel 2 to rear panel 4.

Rear panel 4 functions as a reference panel when the sunroof is moved, such that when the sunroof is folded, middle panel 3 and front panel 2 are stacked on rear panel 4, and when the sunroof panel is unfolded, middle panel 3 and front panel 2 are developed from rear panel 4.

The structure of sunroof panel 1 may be divided into two steps, one step, or three or more steps, in accordance with the specifications of the vehicle, with the triple-division of front panel 2, middle panel 3, and rear panel 4 as a basic structure.

Link units 10 and 10' according to the exemplary embodiment are mounted at left and right side fillers 50 and 50' and implemented by the same components.

Link units 10 and 10' are each composed of a driving link 20 that moves rear panel 4 to trunk room 60 by using the rotational force input from the electric motor, an interlink 30 that horizontally stacks middle panel 3, which is moved up by driving link 20, onto rear panel 4, and a driven link 40 that horizontally stacks front panel 2, which is moved up by interlink 30, on middle panel 3.

Driving link 20 makes only clockwise or counterclockwise rotation for putting and taking out rear panel 4 into/from trunk room 60, without moving upward to change the height of rear panel 4.

In the contrary, interlink 30 makes movement for increasing the height of middle panel 3 larger than the height of rear panel 4 and clockwise or counterclockwise rotation for stacking middle panel 3 on the rear panel 4.

Driven link 40 makes movement for increasing the height of front panel 2 larger than the height of middle panel 4 and clockwise or counterclockwise rotation for stacking front panel 2 on middle panel 3.

Therefore, as the sunroof is opened, rear panel 4, middle panel 3, and front panel 2 are sequentially stacked and received in trunk room 60, and as the sunroof is closed, front panel 2, middle panel 3, and rear panel 4 are sequentially, in the inverse sequence, developed, after being taken out of trunk room 60.

As shown in FIGS. 3A and 3B, driving link 20 is composed of a panel support rod 21 that guides rear panel 4, a panel support bracket 22 where rear panel 4 is combined and that is connected with panel support rod 21, an input rod 23 that receives the rotational force from the power source to move panel support bracket 22, and a coupling rod 24 that operates with input rod 23 and makes up/down movement regardless of the movement of rear panel 4.

The components of driving link 20 are all hinged by hinge pins H.

In the exemplary embodiment, panel support bracket 22 operates as a first operating unit for pulling or pushing interlink 30 while driving link 20 operates, and coupling rod 24 operates as a second operating unit for moving up/down interlink 30.

Panel support rod 21 is bent with a predetermined inclination angle Ea at a predetermined section in the entire length, such that the sunroof is spaced at a predetermined height from a trunk room bottom 61 in a packed state.

Panel support bracket 22 is bent with a predetermined inclination angle Ec, except for a predetermined section in the entire length, such that driving link 20 can be folded in a more compact size and the occupied space of the packed sunroof is minimized.

Input rod 23 is bent at a predetermined angle Eb at a predetermined section in the entire length and this is for being matched with the bending shape of panel support rod in order not to interfere with the movement of panel support rod 21.

As described above, input rod 23 directly receives the rotational force from the electric motor or receives the rotational force through a saw teeth structure or a gear structure.

Coupling rod 24 is moved with input rod 23, with one end connected to input rod 23, and the other end is connected to panel support bracket 22, such that the movement generated by input rod 23 is transmitted to another part (middle panel 3).

For this configuration, coupling rod 24 is composed of a transporting rod 25 connected with input rod 23 by a hinge pin H, a first converting rod 26 connected to the bending end portion of transporting rod 25 by a hinge pin H, and a second converting rod 27 connected to first converting rod 26 by a hinge pin H.

First converting rod 26 and second converting rod 27 are connected at 90 degrees, such that the unfolding length becomes the maximum when first converting rod 26 unfolds second converting rod 27, and the folding length becomes the minimum when it is folded, which is for implementing first and second converting rods 26 and 27 in a more compact size.

First and second converting rods 26 and 27, as shown in FIG. 3B, are connected by a hinge end 22a of panel support bracket 22, and for this configuration, hinge end 22a of panel support bracket 22 is connected by a hinge pin H while covering first and second converting rods 26 and 27, such that it allows first and second converting rods 26 and 27 to rotate when it is not restricted.

As shown in FIG. 4, interlink 30 is composed of a panel support rod 31 that moves middle panel 3 to rear panel 4 by the operation of driving link 20, a panel support bracket 32 that is connected with panel support rod 31 and fixes middle panel 3, a transmission rod 33 that moves up/down middle panel 3 by the operation of driving link 20, and a coupling rod 34 that makes up/down movement regardless of the movement of middle panel 3 by the operation of transmission rod 33.

The components of interlink 30 are all hinged by hinge pins H.

In the exemplary embodiment, panel support bracket 32 operates as a third operating unit for pulling or pushing driven link 40 while interlink 30 operates, and coupling rod 34 operates as a fourth operating unit for moving up/down driven link 40.

In the exemplary embodiment, panel support rod 31 is hinged to panel support bracket 22 of driving link 20 by a hinge pin H while the connecting portion of panel support bracket 22 is bent with a predetermined inclination angle Da.

Middle panel 33 is stacked on rear panel 4 without interference therebetween by the bending at a predetermined angle Da, as described above.

Panel support bracket 32 is bent with a predetermined inclination angle Ed, except for a predetermined section in the entire length, such that interlink 30 can be folded in a more compact size and the occupied space of the packed sunroof is minimized.

Transmission rod 33 is bent with a predetermined inclination angle Db at a predetermined section in the entire length, such that interlink 30 can be folded in a more compact size and the occupied space of the packed sunroof is minimized.

In the exemplary embodiment, transmission rod 33 is moved by force from coupling rod 24 by being connected with second converting rod 27 of coupling rod 24 of driving link 20 by the hinge pin H.

Coupling rod 34 is moved with transmission rod 33, with one end connected to transmission rod 33, and the other end is connected to panel support bracket 32, such that the movement generated by transmission rod 33 is transmitted to another part (front panel 2).

For this configuration, coupling rod 34 is composed of a transporting rod 35 connected with transmission rod 33 by a hinge pin H, a first converting rod 36 connected to the bending end portion of transporting rod 35 by a hinge pin H, and a second converting rod 37 connected to first converting rod 36 by a hinge pin H.

First converting rod 36 and second converting rod 37 are connected at 90 degrees, such that the unfolding length becomes the maximum when first converting rod 36 unfolds second converting rod 37, and the folding length becomes the minimum when it is folded, which is for implementing first and second converting rods 36 and 37 in a more compact size.

First and second converting rods 36 and 37 are connected by a hinge end 32a of panel support bracket 32, and for this configuration, hinge end 32a of panel support bracket 32 is connected by a hinge pin H while covering first and second converting rods 36 and 37, such that it allows first and second converting rods 36 and 37 to rotate when it is not restricted.

Figure 5A:
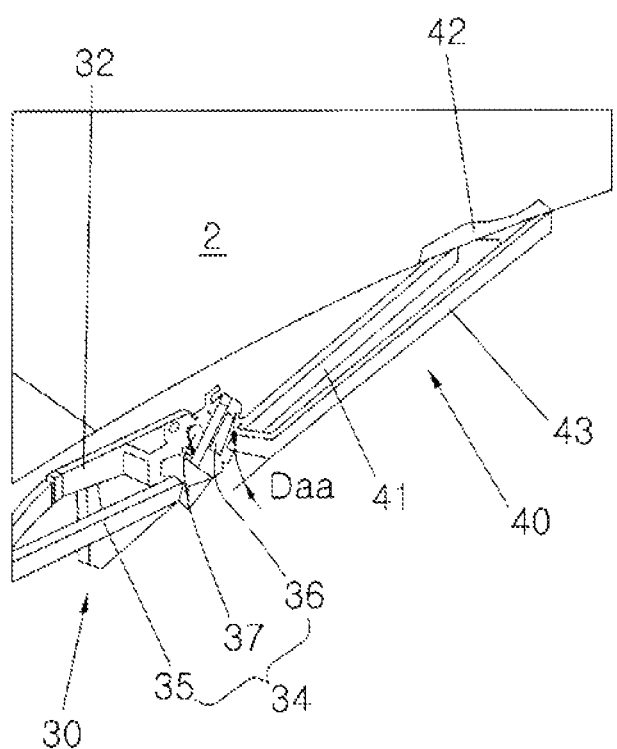
Figure 5B:
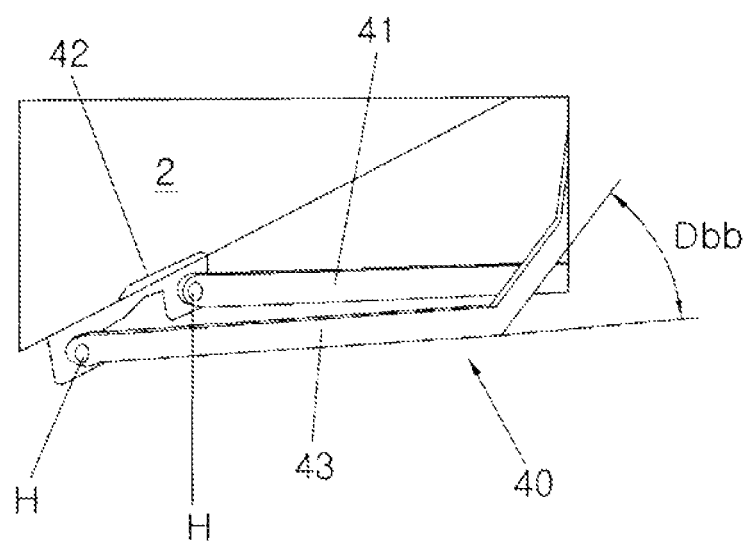

As shown in FIG. 5, driven link 40 is composed of a panel support rod 41 that moves front panel 2 to rear panel 4 by the operation of interlink 30, a panel support bracket 42 connected with panel support rod 41 and fixing front panel 2, and a transmission rod 43 moving up/down front panel 2 by the operation of interlink 30.

The components of driven link 40 are all hinged by hinge pins H.

Panel support rod 41 is hinged to panel support bracket 32 of interlink 30 by a hinge pin H while the connecting portion of panel support bracket 42 is bent with a predetermined inclination angle Daa.

Front panel 2 is stacked on middle panel 3 without interference therebetween by the bending at a predetermined angle Daa, as described above.

Input rod 43 is bent with a predetermined inclination angle Dbb at a predetermined section in the entire length, such that driven link 40 can be folded in a more compact size and the occupied space of the packed sunroof is minimized.

FIG. 6 shows the operation of the sunroof panel folded and horizontally stacked in several steps when the sunroof is opened, in accordance with the exemplary embodiment.

Figure 6B:
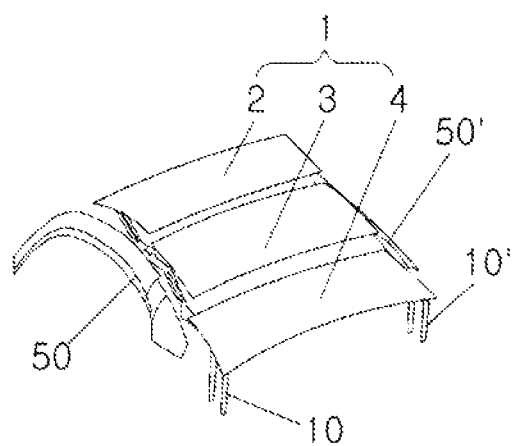
FIGS. 6 to 8 are views showing the operation of the link unit that operates the sunroof panel in accordance with the present invention.

When the electric motor rotates forward (assuming clockwise) by operating a button, with the sunroof closed and the roof of the vehicle is covered with sunroof panel 1, as shown in FIG. 6A, rear panel 4, middle panel 3, and front panel 2 are sequentially and continuously opened, as shown in FIG. 6B.

FIG. 6C shows the initial open state of the sunroof, and as shown in the figure, the rotational force Ma from the electric motor is transmitted to driving link 20 and driving link 20 moves rear panel 4 to trunk room 60 while rotating clockwise.

Further, interlink 30 moves up and lifts middle panel 3 by the operation of driving link 10 and stacks middle panel 3 on rear panel 4 while being rotated clockwise and folded, and driven link 40 moves up and lifts front panel 2 by the operation of interlink 30 and stacks front panel 2 on middle panel 3 while being rotated clockwise and folded.

The movement of driving link 20, interlink 30, and driven link 40 is sequentially and continuously generated.

Figure 7:
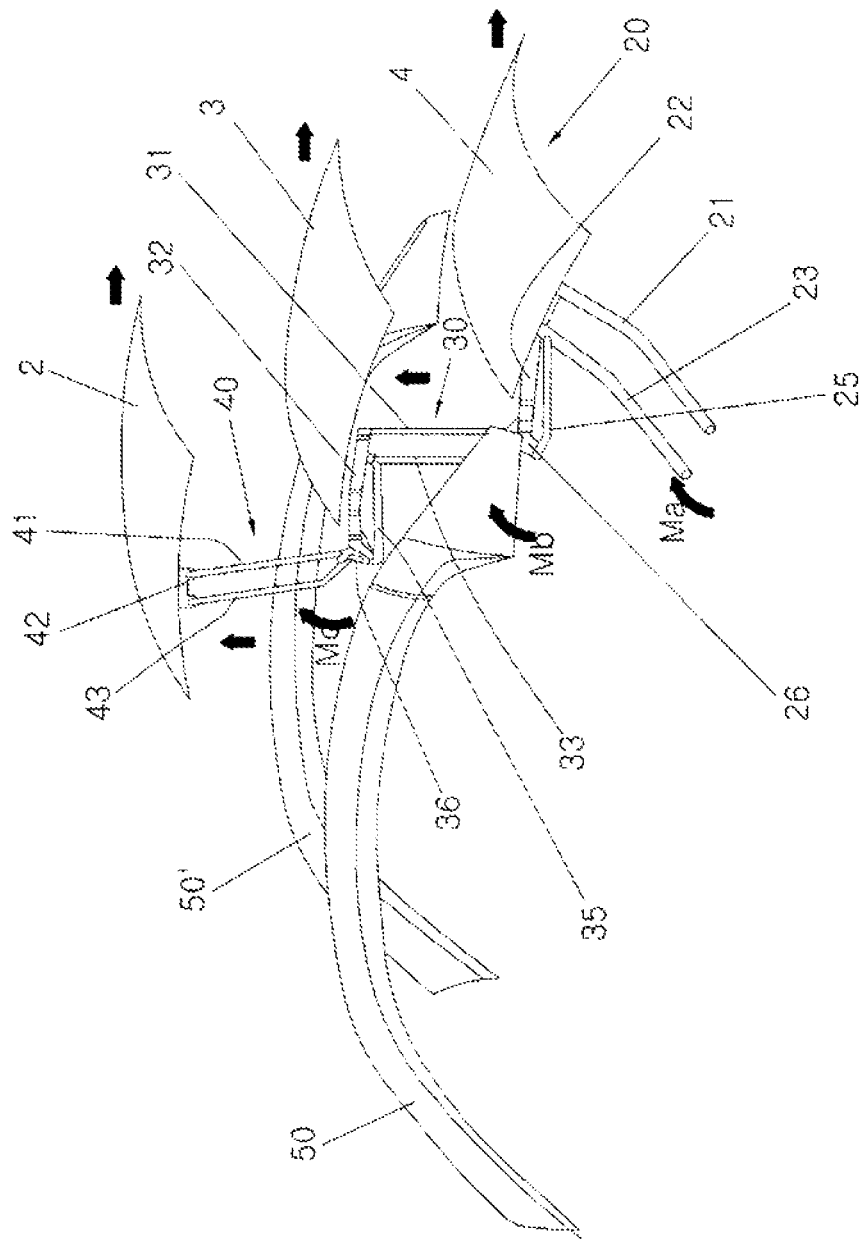

FIG. 7 shows sunroof panel 1 that is open half, and as shown in the figure, the movement of driving link 20 is generated by rotational force Ma applied to input rod 23.

That is, input rod 23 receiving rotational force Ma applies force to panel support bracket 22 fixing rear panel 4, such that panel support bracket 22 is pushed to trunk room 60 and pulls coupling rod 24.

In this operation, panel support bracket 22 and fixed panel support rod 21 rotate about the hinge pin H fixed to the car body, which does not interfere with the movement of panel support bracket 22.

As driving link 20 moves, as described above, panel support bracket 22 of driving link 20 pushes interlink 30 and lifts interlink 30 by using the upward force from clockwise rotation Mb at the end of coupling rod 24.

Accordingly, interlink 30 simultaneously generates the movement for lifting middle panel 3 and the movement for moving middle panel 3 to rear panel 4.

As interlink 30 moves, as described above, panel support bracket 32 of interlink 30 pushes driven link 40 and lifts driven link 40 by using the upward force from clockwise rotation Mc at the end of coupling rod 34.

Accordingly, driven link 40 also simultaneously generates the movement for lifting front panel 2 and the movement for moving front panel 2 to middle panel 3.

Figure 8:
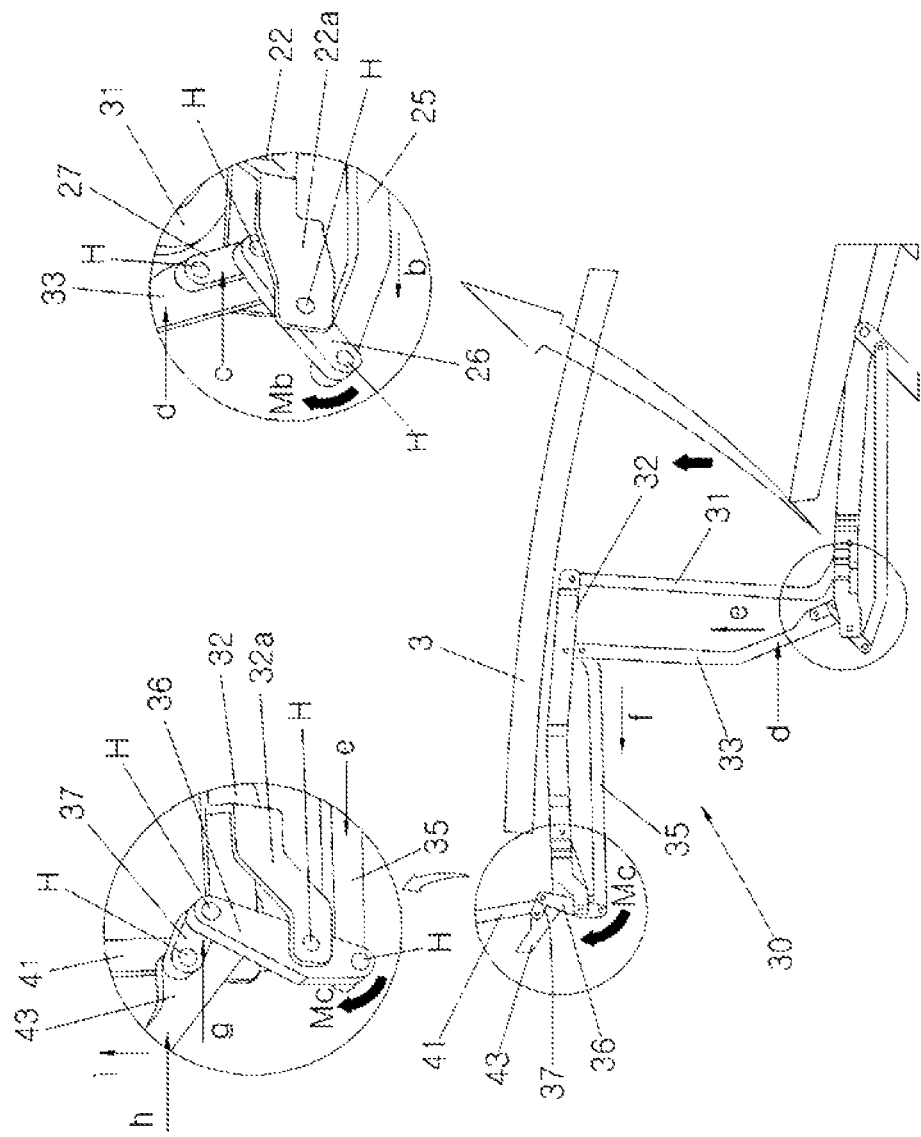

FIG. 8 shows upward movement and rotation of interlink 30 and driven link 40, which is described above.

Input rod 23 is moved in the direction (a) by rotational force Ma of the electric motor which is applied to driving link 20, such that panel support bracket 22 connected with rear panel 4 is pulled and the transporting rod fixed to input rod 23 is pushed in the direction (b).

As first converting rod 26 connected to the end is pushed up by the movement of transporting rod 25, as described above, first converting rod 26 makes clockwise rotation Mb about hinge pin H disposed at a hinge fend 22a of panel support bracket 22.

Accordingly, second converting rod 27 fixed to first converting rod 26 is pushed in the direction (c) opposite to the direction b, which is the movement direction of transporting rod 25. The rotation of first converting rod 26 and the corresponding movement of second converting rod 27 convert the perpendicular connection of first converting rod 26 and second converting rod 27 into a straight unfolded state.

As described above, as the perpendicular state of first converting rod 26 and second converting rod 27 is converted into a straight state, the vertical height necessarily increases as much as an increase in the entire length of first converting rod 26 and second converting rod 27.

That is, second converting rod 27 is perpendicular to first converting rod 26 when the sunroof is closed, but is converted into the unfolded straight state with first converting rod 26 when the sunroof is open.

The increase in height is transmitted to interlink 30 connected to second converting rod 27, such that interlink 30 can move up.

The upward movement of interlink 30 is transmitted to transmission rod 33, such that transmission rod 33 is pulled in the direction (d), the same as second converting rod 27, and also moved up in the direction (e), that is, upward.

Interlink 30, which moves upward as described above, also generates movement of pulling panel support rod 31 through panel support bracket 22 of driving link 20.

The movement of interlink 30 due to driving link 20, which is described above, is also generated in driven link 40 by interlink 30.

That is, in interlink 30, transporting rod 35 is pushed in the direction (f) by transmission rod 33 and pushes first converting rod 36 connected to the end of transporting rod 35 in the same direction.

Accordingly, in first converting rod 36, clockwise rotation Mc about hinge pin H disposed at a hinge fastening end 32a of panel support bracket 32 is generated.

Clockwise rotation Mc of first converting rod 36 pulls second converting rod 37 fixed thereto in the direction (g) opposite to the direction (f), which is the movement direction of transporting rod 35.

The rotation of first converting rod 36 and the corresponding movement of second converting rod 37 convert the perpendicular connection state of first converting rod 36 and second converting rod 37 into a straight unfolded state.

That is, second converting rod 37 is perpendicular to first converting rod 36 when the sunroof is closed, but is converted into the unfolded straight state with first converting rod 36 when the sunroof is open.

As described above, as the perpendicular connection state of first converting rod 36 and second converting rod 37 is converted into a straight state, the vertical height necessarily increases as much as an increase in the entire length of first converting rod 36 and second converting rod 37.

The increase in height is transmitted to driven link 40 connected to second converting rod 37, such that driven link 40 can move up.

The upward movement of driven link 40 is transmitted to transmission rod 43, such that transmission rod 43 is pulled in the direction (h), the same as second converting rod 37, and also moved up in the direction (i), that is, upward.

Driven link 40, which moves upward as described above, also generates movement of pulling panel support rod 41 through panel support bracket 32 of interlink 30.

As described above, as sunroof panel 1 is opened, panel support bracket 22 of driving link 20 pulls panel support rod 31 of interlink 30 and panel support bracket 22 of interlink 30 pulls panel support rod 41 of driven link 40, such that middle panel 3 and front panel 2 can be moved with rear panel 4 moving to trunk room 60.

Coupling link 24 of driving link 20 lifts interlink 30 by moving coupling link 34 of interlink 30 and coupling rod 34 of interlink 30 lifts driven link 40 by moving transmission rod 43 of driven link 40.

In the exemplary embodiment, as driving link 20, interlink 30, and driven link 40 are simultaneously moved, as described above, driving link 20, interlink 30, and driven link 40 are folded in a compact size, and middle panel 3 and front panel 2 can be sequentially stacked on rear panel 4.

Figure 9:
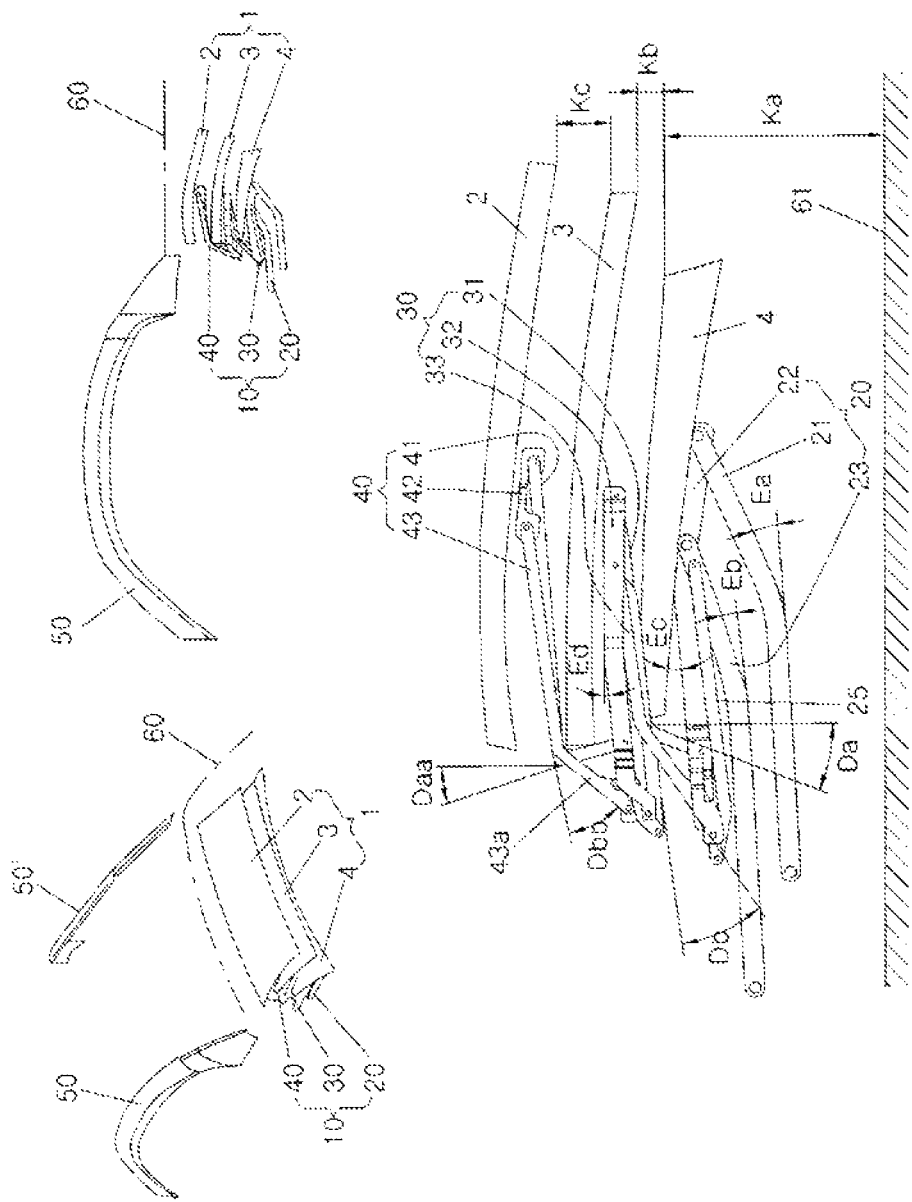
FIG. 9 is a view showing when a sunroof panel is full open and received in a trunk room in accordance with the present invention.
Figure 10:
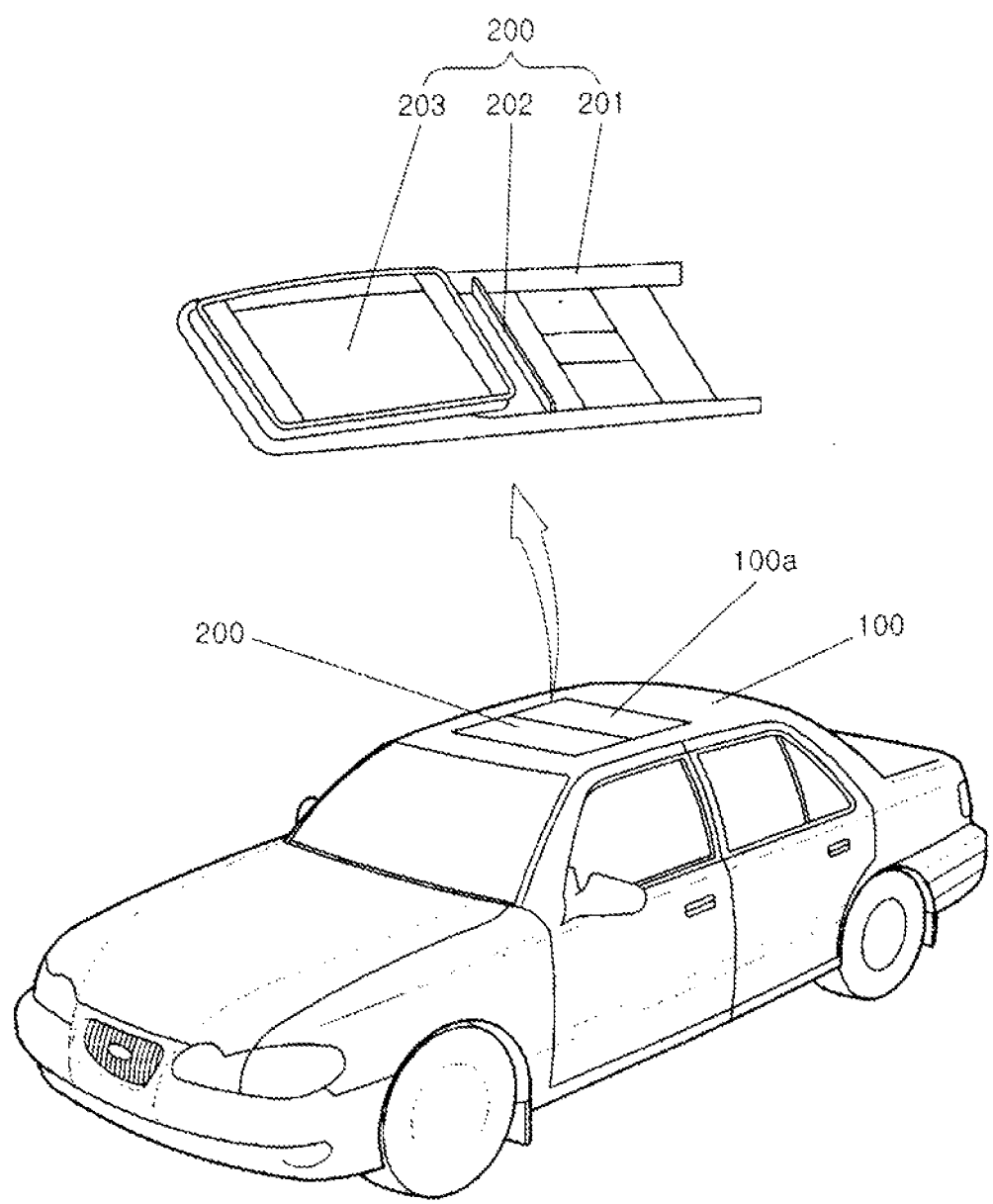
FIG. 10 is a view showing a common configuration of a sliding type sunroof of the related art.

FIG. 9 shows when sunroof panel 4 horizontally stacked in several steps in accordance with the exemplary embodiment is received in trunk room 60.

Sunroof panel 1 is folded with middle panel 3 on rear panel 4 and front panel 2 on middle panel 3, such that it is possible to minimize the occupied space in trunk room 60 when sunroof panel 1 is received.

As shown in FIG. 9, when the sunroof apparatus is completely received in trunk room 60, driving link 20 is horizontally laid with a gap Ka from trunk room bottom 61, interlink 30 is horizontally laid with a gap Kb from rear panel 4 of driving link 20, and driven link 40 is horizontally laid with a gap Kc from middle panel 3 of interlink 30.

When driving link 20 is folded, as described above, the distance from rear panel 4 to panel support rod 21 and input rod 23 is reduced as small as possible by the bending structure with inclination angles Ea and Eb while transporting rod 25 is in contact with panel support bracket 22 as close as possible by the unfolded structure of first converting rod 26 and second converting rod 27.

When interlink 30 is folded, as described above, panel support rod 31 and transmission rod 33 are in contact with rear panel 4 as close as possible by the bending structure with inclination angles Da and Db while transporting rod 35 is in contact with panel support bracket 32 as close as possible by the unfolded structure of first converting rod 36 and second converting rod 37.

Accordingly, interlink 30 is in contact as close as possible, but it is folded in a compact size with sufficient gap Kb.

As driven link 40 is folded, as described above, panel support rod 41 and transmission rod 43 are in contact with middle panel 3 as close as possible by the bending structures with inclination angles Daa and Dbb.

Accordingly, driven link 40 is in contact as close as possible, but it is folded in a compact size with sufficient gap Kc.

As described above, since driving link 20, interlink 30, and driven link 40 are folded in a more compact size by bring the components in contact as close as possible, the space occupied by them in trunk room 60 can be correspondingly minimized.

In the exemplary embodiment, closing of the sunroof is performed in the inverse sequence of the opening of the sunroof, which is described above, such that the detailed description is not provided.

As described above, since the roof of a vehicle is divided into three panels 2, 3, and 4, except for side fillers 50 and 50' and implemented by multi-links 20, 30, and 40 that connect the movement of panels 2, 3, and 4 such that they are sequentially folded and horizontally stacked, in the sunroof apparatus of the exemplary embodiment, all of the portions are completely open, except for left and right side fillers 50 and 50' of the roof of the vehicle when the sunroof is open, such that it is possible to provide open feel, which is maximized, like a convertible car.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A horizontal folding type sunroof apparatus comprising:
a sunroof panel that divides a roof panel, except for left and right side fillers of the roof of a vehicle, into a base panel and at least one or more panels, and is fully opened such that the divided panels are stacked horizontally with the base panel and received in a trunk room; and
a link unit that moves the base panel by using power input with the base panel connected with the divided panels, allows the divided panels to be folded and horizontally stacked in several steps with at least one or more gaps with respect to the base panel, and generates movement for sequentially unfolding the divided panels from the base panel,
wherein the sunroof panel divides the roof panel into a middle panel and a front panel extending to the front portion of the vehicle, with a rear panel positioned at the trunk room as the base panel, and the rear panel, the middle panel and the front panel are connected by the link unit,
wherein the link unit includes:
a driving link that is hinged to the roof of the vehicle and receives power to move the rear panel;
an interlink that is pulled from the driving link to move up/down the middle panel and move the middle panel to the rear panel or unfolds the middle panel from the rear panel; and
a driven link that is pulled from the interlink to move up/down the front panel and moves the front panel to the middle panel or unfolds the front panel from the middle panel, and
wherein the driving link includes:
a first panel support rod that is hinged to the roof of the vehicle;
an input rod that makes movement by using the input power;
a first panel support bracket that generates movement of the rear panel about the first panel support rod by the movement by the input rod; and
a first coupling rod that moves up/down by rotation generated at an end thereof by the movement due to the operation of the input rod.

2. The horizontal folding type sunroof apparatus as defined in claim 1, wherein the first panel support rod and the input rod are bent to form the horizontal height of the rear panel when being horizontally folded, and the first panel support bracket is bent to be inclined with respect to the rear panel.

3. A horizontal folding type sunroof apparatus comprising:

a sunroof panel that divides a roof panel, except for left and right side fillers of the roof of a vehicle, into a base panel and at least one or more panels, and is fully opened such that the divided panels are stacked horizontally with the base panel and received in a trunk room; and a link unit that moves the base by using power input with the base panel connected with the divided panels, allows the divided panels to be folded and horizontally stacked in several steps with at least one or more gaps with respect to the base panel, and generates movement for sequentially unfolding the divided panels from the base panel, wherein the sunroof panel divides the roof panel into a middle panel and a front panel extending to the front portion of the vehicle, with a rear panel positioned at the trunk room as the base panel, and the rear panel, the middle panel and the front panel are connected by the link unit, wherein the link unit includes:

a driving link that is hinged to the roof of the vehicle and receives power to move the rear panel;

wherein the driving link includes:

a first panel support rod that is hinged to the roof of the vehicle;

an input rod that makes movement by using the input power;

a first panel support bracket that generates movement of the rear panel about the first panel support rod by moving through the input rod; and a first coupling rod that move up/down by generating rotation at the opposite side from the movement due to the operation of the input rod;

an interlink that is pulled from the driving link to move up/down the middle panel and move the middle panel to the rear panel or unfolds the middle panel from the rear panel; and a driven link that is pulled from the interlink to move up/down the front panel and moves the front panel to the middle panel or unfolds the front panel from the middle panel, and wherein the interlink includes:

a second panel support rod that is fixed to the first panel support bracket of the driving link to follow the movement of the first panel support bracket;

a second panel support bracket that is moved through the second panel support rod and generates the movement of the middle panel;

a first transmission rod that is fixed to the second panel support bracket to move up/down the middle panel by using the movement from the first coupling rod of the driving link; and a second coupling rod that moves up/down by generating rotation at the opposite side by using the movement of the first transmission rod.

4. The horizontal folding type sunroof apparatus as defined in claim 3, wherein the second panel support rod and the first transmission rod are bent to reduce the gap between the rear panel and the middle panel when being horizontally folded, and the second panel support bracket is bent to be inclined with respect to the middle panel.

5. The horizontal folding type sunroof apparatus as defined in claim 1 or 3, wherein the rotating portion of the first and second coupling rods are hinged to the first and second panel support bracket and form a rotational center.

6. The horizontal folding type sunroof apparatus as defined in claim 3, wherein the driven link includes:

a third panel support rod that is fixed to the second panel support bracket of the interlink and follows the movement of the second panel support bracket;

a third panel support bracket that generates movement of the front panel by moving through the third panel support rod; and a second transmission rod that is fixed to the third panel support bracket to move up/down the front panel by using the movement of the second coupling rod of the interlink.

7. The horizontal folding type sunroof apparatus as defined in claim 6, wherein the third panel support rod and the second transmission rod are bent to reduce the gap between the middle panel and the front panel when being horizontally folded.

* * * * *